Patented Apr. 10, 1951

2,548,161

UNITED STATES PATENT OFFICE 2,548,161

PROCESS FOR THE PREPARATION OF BETA-CHLORO ACYL CHLORIDE

Jacob Eden Jansen, Akron, and Warren L. Beears, Cleveland, Ohio, assignors to The B. F. Goodrich Company, New York, N. Y., a corporation of New York No Drawing. Application March 22, 1950, Serial No. 151,312

7 Claims. (Cl. 260—544)

This invention relates to an improved process for producing beta-chloro acyl chlorides by the reaction of beta-lactones with thionyl chloride, and pertains particularly to a method whereby technical grade thionyl chloride may be utilized in said process.

In U. S. Patent 2,411,875 to Thomas L. Gresham and Forrest W. Shaver, it is disclosed that beta-lactones react with halides of inorganic oxyacid anhydrides containing at least two halogen atoms to form beta-halo acyl halides substantially according to the following equation:

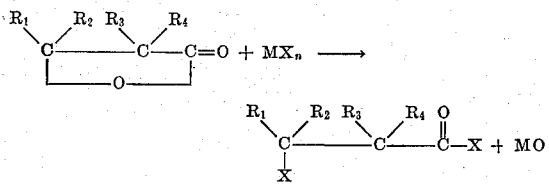

where $MX_n$ represents the halide of an inorganic oxy-acid anhydride containing at least two halogen atoms, and $R_1$, $R_2$, $R_3$ and $R_4$ represent hydrogen or an organic residue linked to carbon atoms such as alkyl, aryl, aralkyl, or alkyl aryl groups. As a specific example of this reaction, it is therein disclosed that when beta-lactones are added to thionyl chloride over a period of several hours, beta-chloro acyl chlorides are obtained.

It has been found, however, that the method of the specific example of the aforementioned patent proceeds in the manner described only when chemically pure (C. P. grade) thionyl chloride and beta-lactone are utilized. When technical grade reactants are used in the process of the patent the reaction product is a tarry mass from which the quantity of beta-chloro acyl chloride obtained is quite small. Because of this fact and because chemically pure thionyl chloride is obtainable in only relatively small quantities and at high cost, the process of the patent as it applies to the beta-lactone-thionyl chloride reaction has not heretofore been suited for use on an industrial or semi-industrial scale.

Accordingly, it is an object of the present invention to provide an improved process whereby technical grade thionyl chloride and beta-lactone may be used in the preparation of beta-chloro acyl chlorides. A second object is to provide an improved process for the preparation of beta-chloro acyl chlorides which process is suitable for use on an industrial scale. Other objects will be apparent from the description which follows.

We have now discovered that the above and other objects are readily attained by adding technical grade beta-lactone to technical grade thionyl chloride while maintaining the temperature of the resulting mixture below 30° C., thereafter adding a strong acid catalyst, and heating the reaction mixture to volatilize sulfur dioxide and complete the reaction. In this manner relatively high yields of substantially pure beta-chloro acyl chlorides are obtained, even though reactants of technical grade purity are utilized. This improved process provides a convenient and economical method for preparing beta-chloro acyl chlorides which are very valuable chemical compounds. They are useful as intermediates for the synthesis of many organic compounds because of the presence of two chlorine atoms among the other functional groups which are present. For example, these beta-chloro acyl chlorides may be employed as intermediates for the formation of acrylic acid, substituted acrylic acids and esters and amides of such acids, as well as for many other uses known to those versed in the art of organic synthesis.

The reaction of beta-lactones with thionyl chloride in accordance with this invention is believed to proceed substantially according to the following equation, the compound within the brackets being only an unisolated intermediate:

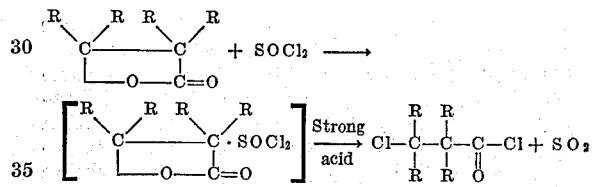

wherein each R is hydrogen or an organic residue such as alkyl, aryl, aralkyl or alkyl aryl groups. The preferred beta-lactones of this class include saturated aliphatic beta-lactones such as beta-propiolactone, beta-butyrolactone, alpha-methyl-beta - propiolactone, n - valerolactone, alpha-methyl - beta - butyrolactone, alpha-ethyl-beta-propiolactone, isovalerolactone, n-caprolactone, alpha - methyl - n - valerolactone, beta-methyl-beta-ethyl propiolactone, alpha, alpha-dimethyl beta-propiolactone, with those beta-lactones of this type in which each R is either hydrogen or a lower alkyl radical being especially preferred. Other types of beta-lactones may also be utilized: for example, beta-phenyl-beta-propiolactone, alpha-phenyl-beta-propiolactone, beta-benzyl-beta - propiolactone, beta-cyclohexyl-beta-propiolactone, beta-nitrophenyl-(ortho, meta and para) propiolactones, beta-(orthonitro-metamethoxyphenyl) propiolactone, alpha-oxy-beta-phenyl propiolactone, and the like.

The improved process of this invention is preferably carried out by slowly adding the beta-lactone to the thionyl chloride in a solvent or diluent if desired, while maintaining the temperature of the mixture below 30° C., and preferably at 20° C. to 30° C. By adding the lactone to the thionyl chloride appreciable rise in the temperature of the reaction mixture is avoided. After addition of the lactone is complete, the acid catalyst is added to the reaction mixture and the mixture heated at about 35° to 65° C. or higher until evolution of sulfur dioxide is substantially complete. Sulfur dioxide is also evolved, but at a slower rate, even when no heat is applied. The reaction mixture is then distilled, desirably at reduced pressures to give a forefraction consisting primarily of unreacted thionyl chloride and a second fraction which consists of substantially pure beta-chloro acyl chloride, which may be even further purified by additional distillation.

The two reactants may be brought together in any desired ratio. However, in general it is desirable that an excess of thionyl chloride, for example, from 1.1 to 3.0 moles for each mole of the beta-lactone be utilized, especially when crude thionyl chloride is used in order to make up for the impurities normally present in crude reactants.

Any of the conventional strong acid catalysts, for example, sulfuric acid, phosphoric acid, hydrochloric acid, benzene and toluene sulfonic acids and the like, may be utilized to catalyze the second step of the reaction, with concentrated sulfuric being especially effective. The acid is generally present in catalytic amounts of about 0.5% to 5% by weight of the reactants with from 1.0% to 2.0% by weight being especially preferred.

The following examples are intended to illustrate the process of this invention. There are, of course, numerous variations and modifications in the procedure which will be apparent to those skilled in the art. All parts are by weight.

Example I 216 parts (3 moles) of beta-propiolactone are slowly added with stirring to 447 parts (3.9 moles) of technical grade thionyl chloride, external cooling being applied intermittently to keep the reaction temperature below 30° C. After addition of the beta-lactone is complete, 18.4 parts of concentrated sulfuric acid are added to the reaction mixture and the solution is heated for about 2 hours at 35° to 65° C. in order to drive off sulfur dioxide and to complete the reaction. The reaction mixture is then vacuum distilled. Unreacted thionyl chloride is obtained as a first fraction after which 256 parts (67.2%) of beta-chloropropionyl chloride (B. P. 76° to 86° C./140 mm.) are recovered.

Example II

Example I is repeated utilizing 720 parts (10 moles) of beta-pripiolactone, 1547 parts (13 moles) of technical grade thionyl chloride and 62 parts of concentrated sulfuric acid. Upon vacuum distillation of the reaction product 980 parts (69.5%) of substantially pure beta-chloropropionyl chloride are obtained.

Example III

The procedure of Example I is carried out except that alpha-methyl beta-propiolactone is substituted for beta-propiolactone. The reaction mixture is then distilled at reduced pressure whereupon beta-chloro-alpha-methyl propionyl chloride is obtained in appreciable yield.

Moreover, when other beta-lactones of the type disclosed hereinabove are reacted with technical grade thionyl chloride in accordance with the method of this invention, beta-chloro acyl chlorides are also obtained in good yields. For example, beta-butyrolactone reacts with thionyl chloride to give beta-chloro-butyryl chloride, and beta-phenyl-beta-propiolactone reacts with thionyl chlorid to give beta-chloro-beta-phenyl propionyl chloride.

In order to demonstrate the great advantages of utilizing the improved process of the present invention, a mole of beta-propiolacetone is slowly added to two moles of technical grade thionyl chloride in the absence of a catalyst. The reaction mixture is distilled at reduced pressure and substantially all of the thionyl chloride is recovered unreacted as a forefraction. The remainder of the reaction mixture is a tarry mass from which only a very small amount, in fact, less than one per cent, of beta-chloropropionyl chloride is obtained. It is readily apparent therefore, that the process of this invention is of great importance in the preparation of beta-chloro acyl chlorides, which as has been shown hereinabove, are very useful for a large number of purposes.

Although specific examples are included herein, it is not intended to limit the invention solely thereto, for numerous modifications will be apparent to those skilled in the art, and are within the scope of the appended claims.

We claim:

1. In a method for preparing beta-chloro acyl chlorides which comprises reacting a beta-lactone with thionyl chloride, the improvement which comprises adding the beta-lactone to the thionyl chloride while maintaining the temperature of the reaction mixture below 30° C., and thereafter adding a strong acid catalyst.

2. In a method for preparing beta-chloro acyl chlorides which comprises reacting a beta-lactone with thionyl chloride, the improvement which comprises adding the beta-lactone to the thionyl chloride while maintaining the temperature of the reaction mixture below 30° C., thereafter adding a strong acid catalyst, and heating the resulting reaction mixture until evolution of sulfur dioxide is substantially complete.

3. In a method for preparing beta-chloro acyl chlorides which comprises reacting a saturated aliphatic beta-lactone with thionyl chloride, the improvement which comprises adding the beta-lactone to the thionyl chloride while maintaining the temperature of the reaction mixture below 30° C., thereafter adding a strong acid catalyst, and heating the resulting mixture until evolution of sulfur dioxide is substantially complete.

4. In a method for preparing beta-chloro acyl chlorides which comprises reacting a saturated aliphatic beta-lactone with thionyl chloride, the improvement which comprises adding the beta-lactone to the thionyl chloride while maintaining the temperature of the reaction mixture below 30° C., thereafter adding a strong acid catalyst, heating the resulting mixture to a temperature of from 35° C. to 65° C. until evolution of sulfur dioxide is complete, and then distilling the reaction mixture to recover said beta-chloro acyl chloride.

5. In a method for preparing beta-chloropropionyl chloride which comprises reacting beta-propionlactone with thionyl chloride, the improvement which comprises adding the beta-propiolactone to the thionyl chloride while maintaining the temperature of the reaction mixture below 30° C., thereafter adding a strong acid catalyst, heating the resulting mixture until evolution of sulfur dioxide is substantially complete, and then distilling the reaction mixture to recover said beta-chloropropionyl chloride.

6. In a method for preparing beta-chloropropionyl chloride which comprises reacting beta-propiolactone with thionyl chloride, the improvement which comprises adding the beta-propiolactone to the thionyl chloride while maintaining the temperature of the reaction mixture below 30° C., thereafter adding from 0.5% to 5.0% by weight of concentrated sulfuric acid, heating the resulting mixture to a temperature of from 35° C. to 65° C. until evolution of sulfur dioxide is substantially complete, and then distilling the reaction mixture to recover said beta-chloropropionyl chloride.

7. In a method for preparing beta-chloropropionyl chloride which comprises reacting beta-propiolactone with thionyl chloride, the improvement which comprises adding the beta-propiolactone to the thionyl chloride while maintaining the temperature of the reaction mixture at from 20° C. to 30° C., thereafter adding from 1% to 2% by weight of concentrated sulfuric acid, heating the resulting mixture to a temperature of from 35° C. to 65° C. and distilling the reaction mixture to recover said beta-chloropropionyl chloride.

JACOB EDEN JANSEN.
WARREN L. BEEARS.

No references cited.